Aug. 29, 1939.  E. B. GUZE  2,171,032
MOTOR MOUNTING FOR MACHINE FRAMES
Filed March 29, 1937  3 Sheets-Sheet 3
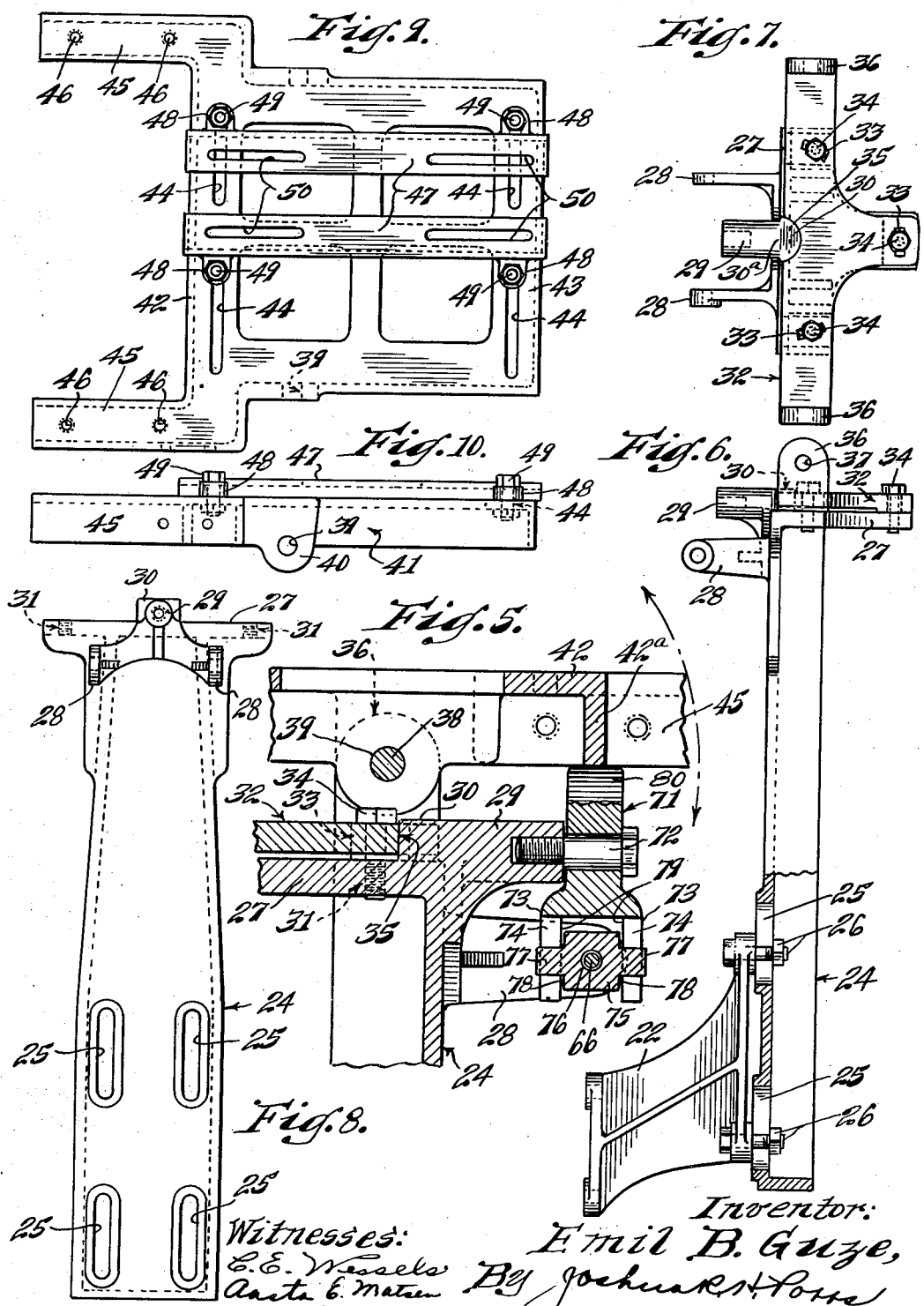
Witnesses:
Inventor:
Emil B. Guze,
his Attorney.

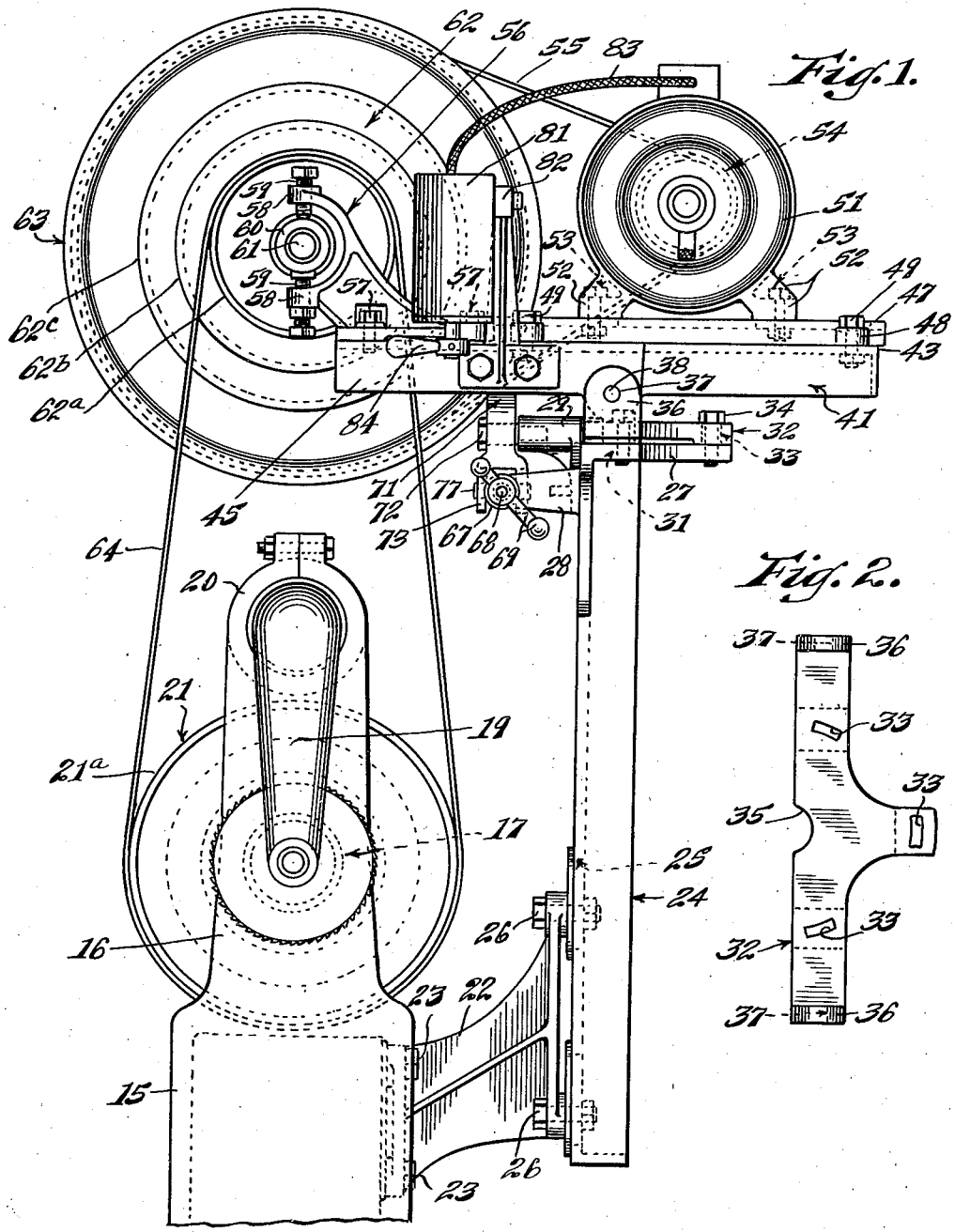

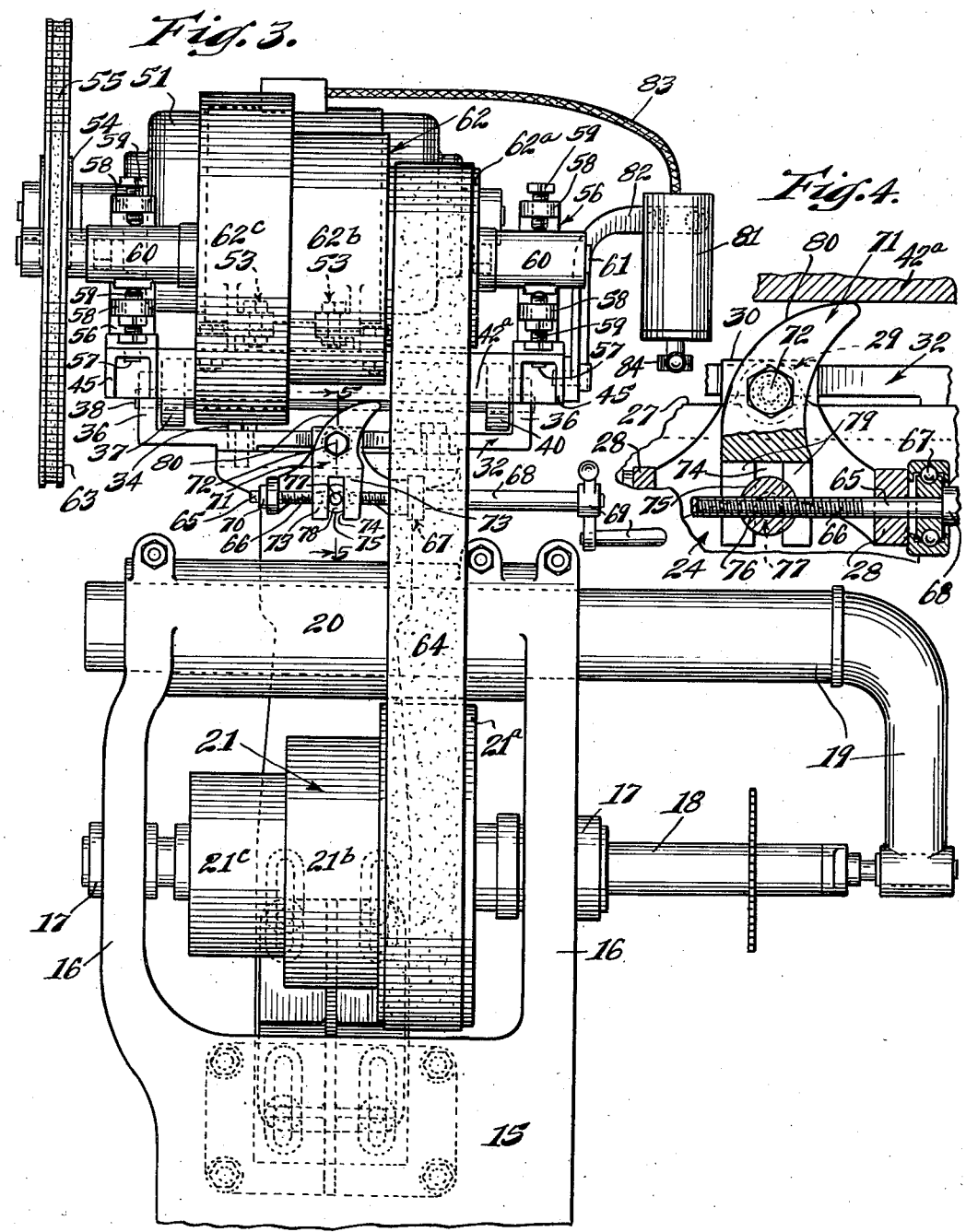

Patented Aug. 29, 1939

2,171,032

UNITED STATES PATENT OFFICE 2,171,032

MOTOR MOUNTING FOR MACHINE FRAMES

Emil B. Guze, Chicago, Ill., assignor to Quality Hardware & Machine Corporation, Chicago, Ill., a corporation of Illinois Application March 29, 1937, Serial No. 133,626

13 Claims. (Cl. 248—16)

This invention relates to motor mountings for machine frames.

An object is to provide a simple, practical, and efficient device of the character described.

Another object is to provide a universally adjustable mounting for motor drives used for lathes, shapers, and other machines.

Another object is to provide an adjustable mounting of the character described adapted to be attached to the machine itself.

Other objects and advantages will appear and be brought out more fully in the following specification, reference being had to the accompanying drawings, wherein:

Fig. 1 is a front elevation of the upper portion of a milling machine illustrating my invention in connection therewith;

Fig. 2 is a detail view of one of the elements;

Fig. 3 is a side view of the disclosure of Fig. 1;

Fig. 4 is an enlarged fragmentary section of the tilting mechanism;

Fig. 5 is an enlarged fragmentary sectional view taken along the line 5—5 of Fig. 3;

Fig. 6 is an elevation of the pedestal portion of the invention;

Fig. 7 is a plan view of the same;

Fig. 8 is a side view of the same;

Fig. 9 is a plan view of the tiltable frame; and

Fig. 10 is a side view of the same.

Referring more particularly to the drawings, I show a milling machine frame 15 having bracket portions 16 adapted to support bearings 17 for a spindle 18, the free end of which is supported by an end bearing adjustable bracket 19 carried by a clamp saddle 20, which in turn is supported by brackets 16. A cone pulley 21 is secured to the shaft of spindle 18 and has step pulleys 21a, 21b, and 21c. A bracket 22 is suitably secured to the side of frame 15 as by bolts 23 and adjustably supports a pedestal 24 having slots 25, bolts 26 being employed to effect this attachment. The upper portion of pedestal 24 comprises a horizontal supporting plate 27 having a pair of oppositely disposed ears 28 and a bearing hub 29, a portion of which hub is formed above the level of plate 27 and forms a semi-circular abutment 30, the circular center of which is designated 30a. Plate 27 has a plurality of tapped holes 31 preferably two near the ends, by which a horizontal angular adjustment plate 32 is secured, there being arcuate, diagonal, and oppositely arranged diverging elongated slots 33 in plate 32 concentric to the axis of the plate through which bolts 34 are passed for the attachment of plate 32 to plate 27 to permit adjustment in opposite directions intersecting and traversing one another. A semicircular socket 35 having substantially the same curvature as circular abutment 30 is formed in plate 32, and it will be apparent that plate 32 is adjustable horizontally within the limits of slots 33 about a vertical axis through the center point 30a. A pair of upstanding ears 36 are provided at the ends of plate 32 and have aligned bearing apertures 37 for a bearing shaft 38 which passes through bearing apertures 39 of a bearing bracket 40 of a tiltable frame 41. The frame 41 is formed with sides 42 and 43 in which are formed slots 44 and has a pair of extension arms 45 provided with tapped holes 46. A pair of base bars 47 having apertured lugs 48 are secured to frame 41 by bolts 49 engaging slots 44. Each bar 47 is provided with elongated slots 50. Bars 47 provide support for a motor 51 which has base lugs 52 which are secured to bars 47 through the slots 50 by bolts 53. It will be seen that by this construction the motor is adjustable on frame 41 in either horizontal direction. The shaft to motor 51 is provided with a pulley 54 over which a belt 55 is adapted to pass. A pair of hangers 56 are secured by bolts 57 to extension arms 45 through the holes 46, and each hanger is formed with jaws or upper and lower bearing arms 58 having adjusting screws 59 for the support of bearings 60 for pulley shaft 61, which carries a step pulley 62 having secured thereto pulleys 62a, 62b, and 62c, and a pulley 63 in alignment with motor pulley 54 and connected thereto by belt 55. Pulleys 62a, 62b, and 62c driven from motor 51 are adapted to drive pulleys 21a, 21b, and 21c, a belt 64 being provided for this drive.

A rotatable shaft 65 having a threaded portion 66 is carried by ears 28 and a thrust bearing 67 is mounted on shaft 65 between one of the ears 28 and an enlarged portion 68 of shaft 65. An adjusting crank lever 69 is secured to shaft portion 68 and a locking collar 70 is secured to shaft 65 at the opposite end. A tilting cam 71 is pivotally supported by a stud bolt 72 which has a threaded connection to bearing hub 29. The cam has downwardly extending arms 73 in which slots 74 are formed and a traveling block 75 having a threaded bore 76 is adapted to travel along the threaded portion 66 of shaft 65 and has trunnions 77 located in slots 74 of cam 71 and is further provided with lock faces 78 so arranged between arms 73 that rotation of the block will not occur upon the rotation of the shaft 65, flat faces 79 being formed on arms 73 at slots 74 to effect this result. The cam 71 has a cam surface 80 adapted for engagement with a flange 42a which is formed as a downwardly depending portion of side member 42 of frame 41. A switch box 81 is supported by a bracket 82 on one of the extension arms 45, and an electric cable 83 connects the switch box 81 to the motor 51, the switch box 81 having a switch lever 84.

From the foregoing description the operation of my invention should be apparent. It will be clear that I have provided a motor drive adapted for attachment to any type of machine which is universally adjustable to meet any known conditions encountered in practice. The tension of belt 64 which drives pulley 21 from pulley 62 varies from time to time, means for correction of which must be provided and are so provided by my invention. Also, in practice it is found that when the proper tension of the belt 64 has been provided for pulleys 62a and 21a or 62c and 21c, this tension is not satisfactory if the belt is shifted to pulleys 62b and 21b without adjustment the distance between the shaft 61 and spindle 18. Adjustment of this is provided by my invention by the rotation of cam 71 from the shaft 65 by crank 69, the tiltable frame 41 being tilted upon shaft 38. It is important in all machines of the class under consideration that the shaft 61 be in perfect alinement with the axis of spindle 18 or other driving shaft, and the correctness of this alignment I have provided for by the vertical adjustment of frame 41 which is carried by plate 32, the adjustment about the vertical axis 39a being taken care of by bolts 34 in slots 33. The proper positioning of motor 51 with respect to shaft parallelism with shaft 61 and distance from pulley 63 has been referred to hereinabove. The initial spacing of shaft 61 with respect to spindle axis is taken care of by the adjustable mounting of pedestal 24 on bracket 22.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. In a device of the character described comprising a pedestal, a bracket adapted to be mounted on a machine member, said pedestal being vertically adjustable on the bracket, a plate horizontally adjustable on said pedestal laterally and forwardly and backwardly, a frame pivotally mounted on said plate and means to pivot said frame on said plate, said means including a cam adjustably carried by the plate and engageable with the frame.

2. In a device of the character described comprising a pedestal, a bracket adapted to be mounted on a machine member, said pedestal being vertically adjustable on the bracket, a plate horizontally adjustable on said pedestal laterally and forwardly and backwardly, a frame pivotally mounted on said plate and means to pivot said frame on said plate, said means including a cam pivoted on the plate laterally and having a camming portion engaging the bottom of the frame, and a traveling member carried by the pedestal and engaging one end of the cam to rock the same on its pivot and hold it in adjusted position.

3. In a device of the character described comprising a pedestal, a bracket adapted to be mounted on a machine member, said pedestal being vertically adjustable on the bracket, a plate horizontally adjustable on said pedestal laterally and forwardly and backwardly, a frame pivotally mounted on said plate and means to pivot said frame on said plate, said means including a cam pivoted on the plate and having a cam surface engaging the frame at the inner portion thereof, the opposite end of the cam having a fork, a screw threaded shaft mounted in bearings on the pedestal and having means to turn the same and a block having bearings in the fork of the cam and a threaded aperture receiving the shaft to turn the cam on rotation of the shaft.

4. In a device of the character described comprising a pedestal, a bracket adapted to be mounted on a machine member, said pedestal being vertically adjustable on the bracket, a plate horizontally adjustable on said pedestal laterally and forwardly and backwardly, a frame pivotally mounted on said plate and means to pivot said frame on said plate, said means including a cam pivoted on the plate and having a cam surface engaging the frame at the inner portion thereof, the opposite end of the cam having a fork, a screw threaded shaft mounted in bearings on the pedestal and having means to turn the same and a block having bearings in the fork of the cam and a threaded aperture receiving the shaft to turn the cam on rotation of the shaft, said block having lock faces engaging the fork to prevent rotation of the block.

5. A device of the character described comprising a pedestal adapted to be mounted on a machine member, a plate horizontally adjustable on said pedestal angularly about a central axis, a frame horizontally pivoted on said plate, said frame having means cooperating with means on the pedestal for tilting the frame on the upper end of the pedestal, and motor supporting means on the frame adjustable horizontally in a rectilinear direction at a plurality of angles.

6. A device of the character described comprising a pedestal adapted to be mounted on a machine member, a plate horizontally adjustable on said pedestal angularly about a central axis, a frame horizontally pivoted on said plate, said frame having means cooperating with means on the pedestal for tilting the frame on the upper end of the pedestal, and a motor supporting member horizontally adjustable on the frame in a rectilinear direction, said plate being adjustable in an arc about a vertical axis, and means to hold said parts in adjusted position.

7. A motor mounting for machine frames comprising a pedestal adapted to be mounted on a machine member, a plate horizontally adjustable in an arc on said pedestal, a frame pivotally mounted on said plate for vertical adjustment in an arc and adapted to be adjusted horizontally with said plate and supporting means for a motor on the frame, said supporting means and the motor being adapted for adjustment at intersecting angles.

8. A device of the character described comprising an upright pedestal having means for mounting the same on a machine member for vertical adjustment, a plate horizontally and angularly adjustable at the upper end of the pedestal, a frame pivotally mounted on and above said plate for vertical swinging movement and angular adjustment horizontally about a vertical axis with said plate, and means on the frame for supporting a motor and adapted for horizontal longitudinal and lateral adjustment thereon.

9. A device of the character described comprising a pedestal adapted to be mounted on a machine member having a driven member for vertical adjustment, a plate at the upper end of said pedestal, a second plate horizontally adjustable in an arc on the first plate, a frame pivotally mounted on the second plate for vertical swinging movement and angularly adjustable horizontally about a vertical axis with the second plate, means on the frame for supporting a motor for adjustment at intersecting angles, bearings on the frame for supporting a shaft having driving connections with the motor and driven member and means to adjust the frame on its pivot and hold the same in adjusted position, whereby the driving connections may be tightened and the shaft aligned with the driven member.

10. A motor mounting for machine frames comprising a pedestal having means for mounting the same on a machine member, a sectional plate supported on the pedestal, one section being adjustable angularly in a horizontal plane on the other, a frame pivoted on the adjustable section to swing on a horizontal axis, camming means carried by the pedestal and engaging the frame to swing and hold the same in an adjusted position, motor mounting means on the frame adjustable longitudinally and transversely in a horizontal plane and hangers at one end of the frame for supporting a pulley bearing shaft adapted for operative connection with the motor and a driving shaft of the machine.

11. A device of the character described comprising a pedestal adapted to be mounted on a machine member, a tiltable frame on said pedestal adjustable angularly about a horizontal axis and also adjustable angularly about a vertical axis, and a motor anchoring and supporting means adjustable on the frame.

12. A motor mounting for machine frames comprising a pedestal having means for attachment and vertical adjustment on a machine member, a horizontal frame mounted on the pedestal for angular adjustment horizontally and mounted intermediately of its ends for vertical angular adjustment and motor supporting means mounted on the frame for adjustment longitudinally and transversely.

13. A motor mounting for machine frames comprising a vertical pedestal adapted to be mounted on a machine member, a horizontal support mounted on the pedestal for horizontal adjustment about a vertical axis, a tiltable frame on the pedestal associated with the horizontal support for angular adjustment on a horizontal axis, and means between the pedestal, horizontal support and frame to adjust said frame.

EMIL B. GUZE.